P. B. KENNEDY & E. L. MORROW.
LAND AND WATER VEHICLE.
APPLICATION FILED MAR. 27, 1914. RENEWED AUG. 24, 1916.
1,206,229.
Patented Nov. 28, 1916.
4 SHEETS—SHEET 1.
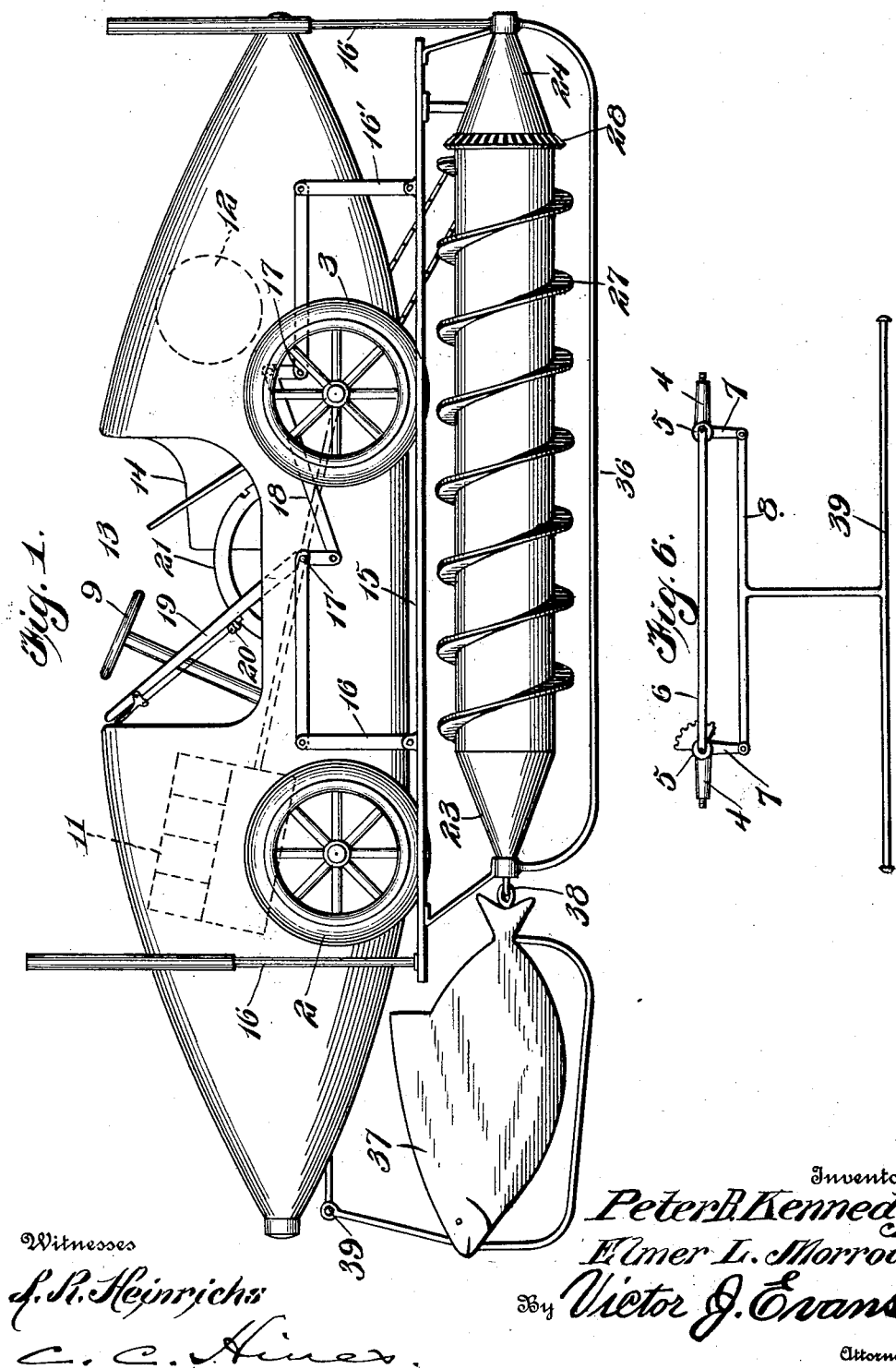

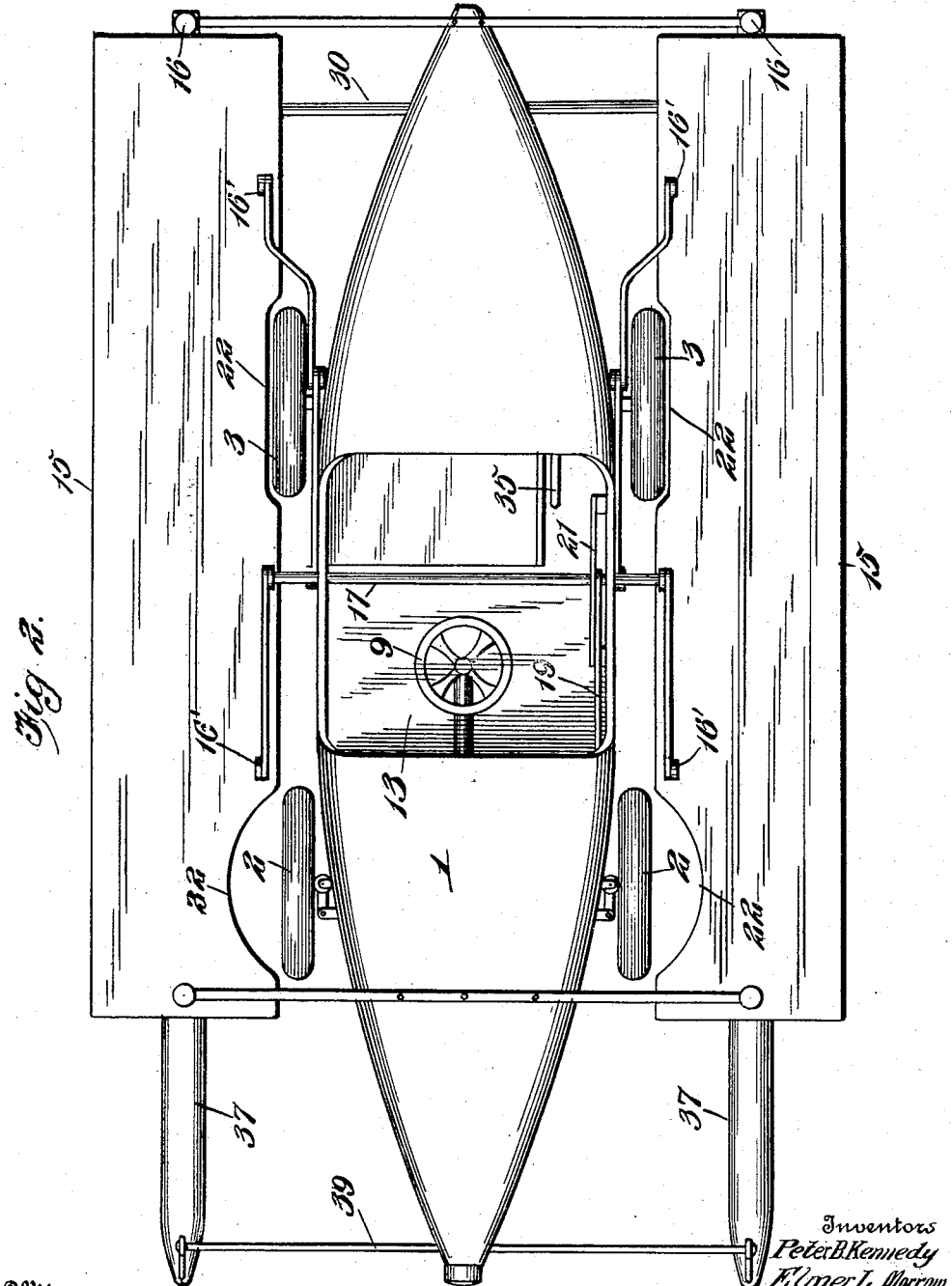

P. B. KENNEDY & E. L. MORROW.
LAND AND WATER VEHICLE.
APPLICATION FILED MAR. 27, 1914. RENEWED AUG. 24, 1916.
1,206,229.
Patented Nov. 28, 1916.
4 SHEETS—SHEET 3.
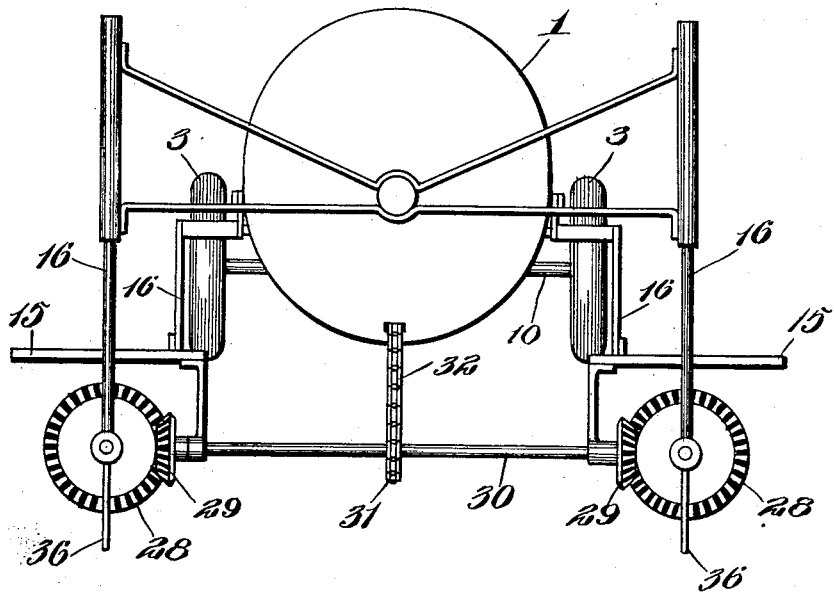
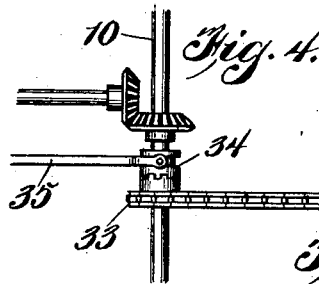
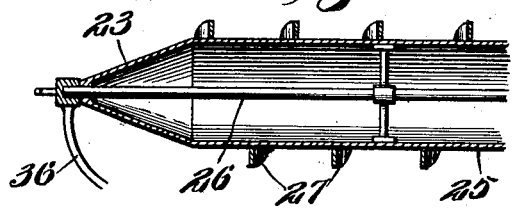
Witnesses
J. R. Heinrichs
C. C. Hines
Inventors
Peter B. Kennedy
Elmer L. Morrow
By Victor J. Evans
Attorney

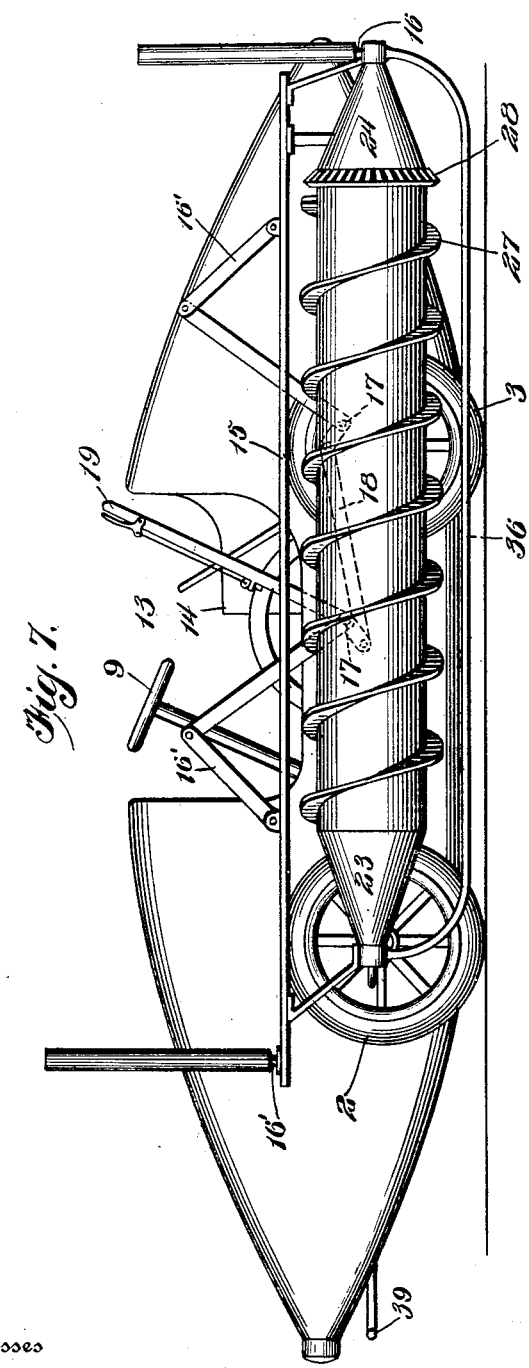

UNITED STATES PATENT OFFICE.

PETER B. KENNEDY AND ELMER L. MORROW, OF SANTA MONICA, CALIFORNIA.

LAND AND WATER VEHICLE.

1,206,229.  Specification of Letters Patent.  Patented Nov. 28, 1916.

Application filed March 27, 1914, Serial No. 827,746. Renewed August 24, 1916. Serial No. 116,703.

*To all whom it may concern:*

Be it known that we, PETER B. KENNEDY and ELMER L. MORROW, citizens of the United States, residing at Santa Monica, in the county of Los Angeles and State of California, have invented new and useful Improvements in Land and Water Vehicles, of which the following is a specification.

This invention relates to improvements in vehicles adapted for travel on both land and water, and has for its primary object to provide a vehicle of this character embodying a hydro-base or bottom flotation structure including floats having revoluble members provided with spiral propeller blades, whereby the vehicle may be sustained upon and propelled along the surface of a body of water.

A further object of the invention is to provide a vehicle of the character described in which the hydro-base is provided with forward pontoons, which are adjustable to serve also as rudders whereby the vehicle may be steered on water with facility.

A further object of the invention is to provide a vehicle of the character described equipped with a hydro-base and running wheels, and which embodies means whereby the hydro-base may be raised or lowered, so that when desired the hydro-base may be disposed above the plane of the lower portions of the wheels, thus adapting the vehicle for land travel.

A still further object of the invention is to provide a vehicle of the character described which is comparatively simple of construction, inexpensive of production, light in weight and adapted to travel over the surface of a body of water with considerable speed.

The invention consists of the features of construction, combination and arrangement of parts herein fully described and claimed, reference being had to the accompanying drawings in which:—

Figure 1 is a side elevation of a combined land and water vehicle embodying our invention. Fig. 2 is a top plan view of the same. Fig. 3 is a rear end elevation of the vehicle. Fig. 4 is a detail view of parts of the drive gearing. Fig. 5 is a longitudinal section through one of the propeller floats and associated parts. Fig. 6 is a detail view of parts of the steering gear. Fig. 7 is a view similar to Fig. 1, showing the hydro-base in raised position, and the steering floats detached.

In carrying our invention into practice, we provide a vehicle body 1, which is preferably cigar-shaped, and is provided with front supporting and steering wheels 2 and rear supporting and driving wheels 3, which may be of the pneumatic-tired type. The wheels 2 are journaled to rotate upon spindles 4 carried by steering knuckles 5 journaled upon a stationary transverse front axle 6, said knuckles having crank arms 7 coupled by a connecting rod 8. This connecting rod is adapted to be actuated from a suitable type of control gear, including a control device 9, which control gear may be of the ordinary automobile type, whereby the front wheels may be simultaneously turned for a steering action. The wheels 3 are mounted upon a transverse driving shaft 10 suitably driven from a motor 11 disposed in the forward portion of the body 1, which motor may be supplied with gasolene or other fuel from a tank 12 contained in the rear portion of the body. The car 1 may be made of aluminum or other suitable material which is light in weight and yet possesses strength and durability, and is provided centrally with a cock-pit or space 13 to accommodate suitable seats 14 and the steering and controlling gear.

The body 1 is mounted upon a hydro-base comprising platforms 15, which are slidably connected with the body by telescopic uprights 16 and are also connected with the body by links 16 coupled to transverse shafts 17 on the body, said shafts being connected by links 18, and one of said shafts being operable by means of a lever 19, whereby the body and hydro-base may be relatively adjusted to dispose the hydro-base above or below the level of the lower portions of the wheels 2 and 3, by which the vehicle is rendered convertible for use as either a water or land vehicle, at will. The lever is provided with a spring actuated dog 20 to engage a rack segment 21, whereby the adjusting mechanism may be locked in adjusted position to hold the hydro-base raised or depressed. The platforms 15 are provided with slots or openings 22 for passage of the wheels 2 and 3, and at the opposite sides of said platforms are disposed parallel, longitudinally extending floats, each comprising front and rear conoidal end portions 23 and 24 and an intermediate cylindrical and revoluble body portion 25, said floats being carried by shafts or axles 26 journaled in suitable bearings on the platforms, whereby the floats are adapted to have free and easy revoluble motion.

Each float body 25 is provided with a spiral propelling blade 27 and carries at its rear end a beveled gear 28, the gears 28 of the two revoluble pontoon sections 25 meshing with beveled gears 29 on a transverse shaft 30, whereby said revoluble pontoon sections are adapted to be driven in unison. On the shaft 30 is a sprocket wheel 31 connected by a chain 32 with a sprocket wheel 33 loosely mounted on the rear driving axle 10. A clutch device 34 adjustable by means of a control lever 35, is provided whereby the clutch 34 may be turned into or out of action at will, so that the water propellers may be disconnected from the drive gearing of the machine when the hydro-base is elevated.

The respective sections 23, 24 and 25 of each pontoon or float may be filled with compressed air or gas, and have sufficient flotation capacity to support the entire weight of the vehicle on the surface of a body of water, while the propeller sections 25 may have a driving capacity sufficient to propel the vehicle over the surface of the water at considerable speed. A guard skid and fender 36 is suitably secured to the platforms or end float sections 23 and 24 and extends along the outer side of each propeller section 25 to protect the spiral propeller blades from contact with logs and other floating objects. Front floats or pontoons 37 are jointed, as at 38, to the forward end of the platform or pontoon sections 23 and are adapted to be raised and lowered with the aforesaid parts of the hydro-base. These forward pontoons 37 are pivotally suspended from a cross rod 39 connected with the steering knuckles 5, by which the said forward pontoons may be adjusted laterally to serve as rudders in steering the machine in water through the same steering gear which actuates the steering wheels 2.

It is evident from the foregoing description that the invention provides a type of vehicle which is adapted by simply raising and lowering the hydro-base for travel upon land or water and which when arranged for water travel will be properly supported upon the surface of the water and may be driven at considerable speed by the revolution of the pontoon propeller sections 25. Also it will be seen that when the hydro-base is raised for the depression of the land wheels for travel and traction purposes on the ground, the drive gearing between the driving axle on the body and the driving axle on the hydro-base may be readily and conveniently thrown out of action, the single motor equipment serving for both water and land traction.

It will, of course, be understood that the parts may be made comparatively light in weight, with proper strength and durability, by the use of aluminum alloys and other light and strong materials.

We claim:—

1. A vehicle of the character described including a body, a hydro-base including platforms adjustably mounted on the body, propeller floats carried by said platforms, means for raising and lowering said platforms in unison, and means for driving the propeller floats.

2. A vehicle of the character described comprising a body, a hydro-base including side platforms adjustably mounted on the body, longitudinally extending shafts supported by the platforms, floats carried by said shafts and provided with propeller blades, means for raising and lowering the platforms, guards carried by the platforms and extending longitudinally beneath the propeller floats and means for driving the propeller floats.

3. A vehicle of the character described including a body, front and rear axles carried by the body, wheels carried by said axles, a motor upon the body for driving the rear axle, a hydro-base consisting of side platforms telescopically connected with the body for vertical adjustment, adjusting means upon the body for raising and lowering said hydro-base, longitudinally extending pontoons revolubly mounted upon the platforms and provided with propeller blades, a cross shaft between the platforms in gear with said revoluble pontoons, a driving connection between the rear axle and the cross shaft, steering floats linked to the body and platforms for a universal motion, and means for adjusting said steering floats.

4. A vehicle of the character described including a body, a hydro-base provided with longitudinally extending revoluble pontoons or floats provided with propeller blades, means for driving said revoluble pontoons, front pontoons pivotally mounted for lateral adjustment, and means for adjusting said front pontoons.

5. A vehicle of the character described including a body provided with front supporting and steering wheels and rear supporting and driving wheels, a motor on the body for transmitting motion to said driving wheels, steering mechanism on the body for adjusting the steering wheels, a hydro-base vertically adjustable with relation to the body, said base being provided with main pontoons having propeller blades and adjustably mounted front steering pontoons, means for adjusting the hydro-base with relation to the body, means for driving the main pontoons from the motor, and means for adjusting the steering pontoons from the said steering gear.

In testimony whereof we affix our signatures in presence of two witnesses.

PETER B. KENNEDY.
ELMER L. MORROW.

Witnesses:
STOVER C. SMITH,
EDWARD J. SULLIVAN.

Copies of this patent may be obtained for five cents each, by addressing the "Commissioner of Patents, Washington, D. C."